(12) United States Patent
Shepard et al.

(10) Patent No.: US 11,527,788 B2
(45) Date of Patent: Dec. 13, 2022

(54) THERMAL MANAGEMENT FOR ELECTRICAL STORAGE DEVICES

(71) Applicant: Hamilton Sundstrand Corporation, Charlotte, NC (US)

(72) Inventors: Charles Patrick Shepard, DeKalb, IL (US); Kris H. Campbell, Poplar Grove, IL (US); Scott R. Bouras, Rockford, IL (US); Shin Katsumata, Rockford, IL (US)

(73) Assignee: Hamilton Sundstrand Corporation, Charlotte, NC (US)

(*) Notice: Subject to any disclaimer, the term of this patent is extended or adjusted under 35 U.S.C. 154(b) by 201 days.

(21) Appl. No.: 16/411,928

(22) Filed: May 14, 2019

(65) Prior Publication Data
US 2019/0267683 A1 Aug. 29, 2019

Related U.S. Application Data

(62) Division of application No. 14/974,835, filed on Dec. 18, 2015, now abandoned.

(51) Int. Cl.
| | |
|---|---|
| H01M 10/613 | (2014.01) |
| H01M 10/6554 | (2014.01) |
| H01M 10/6569 | (2014.01) |
| H01M 10/6567 | (2014.01) |
| H01M 10/615 | (2014.01) |
| H01M 10/63 | (2014.01) |
| H01M 10/6568 | (2014.01) |
| H01M 10/625 | (2014.01) |
| H01M 10/48 | (2006.01) |

(52) U.S. Cl.
CPC ....... *H01M 10/613* (2015.04); *H01M 10/615* (2015.04); *H01M 10/63* (2015.04); *H01M 10/6554* (2015.04); *H01M 10/6567* (2015.04); *H01M 10/6568* (2015.04); *H01M 10/6569* (2015.04); *H01M 10/486* (2013.01); *H01M 10/625* (2015.04)

(58) Field of Classification Search
CPC .................................................. H01M 10/60
See application file for complete search history.

(56) References Cited

U.S. PATENT DOCUMENTS

| | | | |
|---|---|---|---|
| 8,415,041 B2 | 4/2013 | Eisenhour | |
| 8,790,809 B2 | 7/2014 | Schaefer et al. | |
| 2010/0061061 A1* | 3/2010 | Murata | H01M 50/20 361/699 |
| 2013/0252043 A1* | 9/2013 | Allison | H01M 10/42 429/72 |
| 2014/0342197 A1 | 11/2014 | Andres et al. | |

FOREIGN PATENT DOCUMENTS

WO WO-2014176320 A2 10/2014

* cited by examiner

*Primary Examiner* — James Lee
(74) *Attorney, Agent, or Firm* — Locke Lord LLP; Joshua L. Jones; Scott D. Wofsy

(57) ABSTRACT

An energy storage system includes a sealed housing defining an interior space and a plurality of cells arranged within the interior space of the housing. A cooling liquid submerges each of the cells. The cooling system is positioned within the sealed housing configured to actively and passively cool and heat each of the cells.

8 Claims, 4 Drawing Sheets

THERMAL MANAGEMENT FOR ELECTRICAL STORAGE DEVICES

This Application is a Divisional of U.S. patent application Ser. No. 14/974,835 filed on Dec. 18, 2015. The entire content of this application is incorporated herein by reference in it's entirety.

BACKGROUND OF THE INVENTION

1. Field of the Invention

The present disclosure relates to thermal management, and more particularly to heat control of electrical storage devices such as batteries, capacitors, or similar energy storage devices.

2. Description of Related Art

Vehicles and aircrafts using electric power for at least a portion of their operation may store and draw electric power from the multiple individual cells packaged into modules. As the individual cells are charged and discharged, they typically generate heat, e.g., due to Joule heating, caused by current flowing through the internal resistance of the cells. In addition, the individual cells may be subjected to heating via exothermic chemical reactions occurring within the cells. Further, in some cases, elevated ambient temperatures may add heat to the cells via conduction, convection, and/or radiation. These, and other potential, sources of thermoelectrical, thermo-chemical, and environmental heating may cause increased localized temperatures of the cells. The increase in temperature may be aggravated by the tight packaging of multiple cells within the confined space of the module housing. Increased temperatures may increase the rate of chemical reactions, cause physical distortion (e.g., swelling, short circuits, open circuits), that may limit the life of the cells and the module.

Such conventional methods and systems have generally been considered satisfactory for their intended purpose. However, there is still a need in the art for improved systems for thermal management of electrical storage devices. The present disclosure provides a solution for this need.

SUMMARY OF THE INVENTION

An energy storage system includes a sealed housing defining an interior space. A plurality of cells are arranged within the interior space of the housing. A cooling liquid submerges each of the cells. A cooling system is positioned within the sealed housing configured to actively and passively cool and heat each of the cells. The cooling system can define a top surface of interior space of the housing.

The cooling system can include an active condenser, passive condenser, and a cold plate. The passive condenser can be configured to cool the cells while the cooling supply temperature is below a predetermined temperature. The active condenser can be configured to cool the cells above the predetermined temperature. The cold plate can be configured to dissipate heat from the liquid in the active and passive condensers. The cold plate can be configured to cool the cells with the condensers by converting vapor to liquid such that the liquid falls towards the cells through the use of gravity. The condenser can be configured to act passively through the use of thermosyphon while the cooling supply temperature remains below a cell limit. The cooling system can be configured to act actively through the use of a thermosyphon and a second actively cooled condenser, while the cooling supply is above a predetermined temperature.

The cooling system can include a thermal electrical cooler configured to act actively as a thermal heat sink. The thermal electric cooler can operate based on a cooling supply temperature. A sensor can be coupled to a controller configured to sense the cooling supply temperature. In response to the cooling supply temperature exceeding a predetermined limit, the thermal electric cooler can be activated. In response to the cooling supply temperature falling below the predetermined limit, the thermal electrical cooler can be deactivated. The thermal electric cooler can be configured to reverse the direction of heat flow to heat the fluid with the condenser in conditions where the cooling liquid is below an operating temperature of the cells.

The cooling liquid can be a two-phase fluid in the operating temperature range of the cells. The cells can include battery, capacitor, or other energy storage cells. The cooling system can include a heat exchanger configured to remove the heat from the system.

The system can include a pump and expansion valve configured to activate based on cooling supply and component temperature. The system can also include power electronics positioned within the interior space of the housing. The system can further include a super heater, compressor and expansion valve configured to act as a vapor cycle system to cool the cells. The compressor and expansion valve can provide heating to the cells when the cooling fluid is below a predetermined limit.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
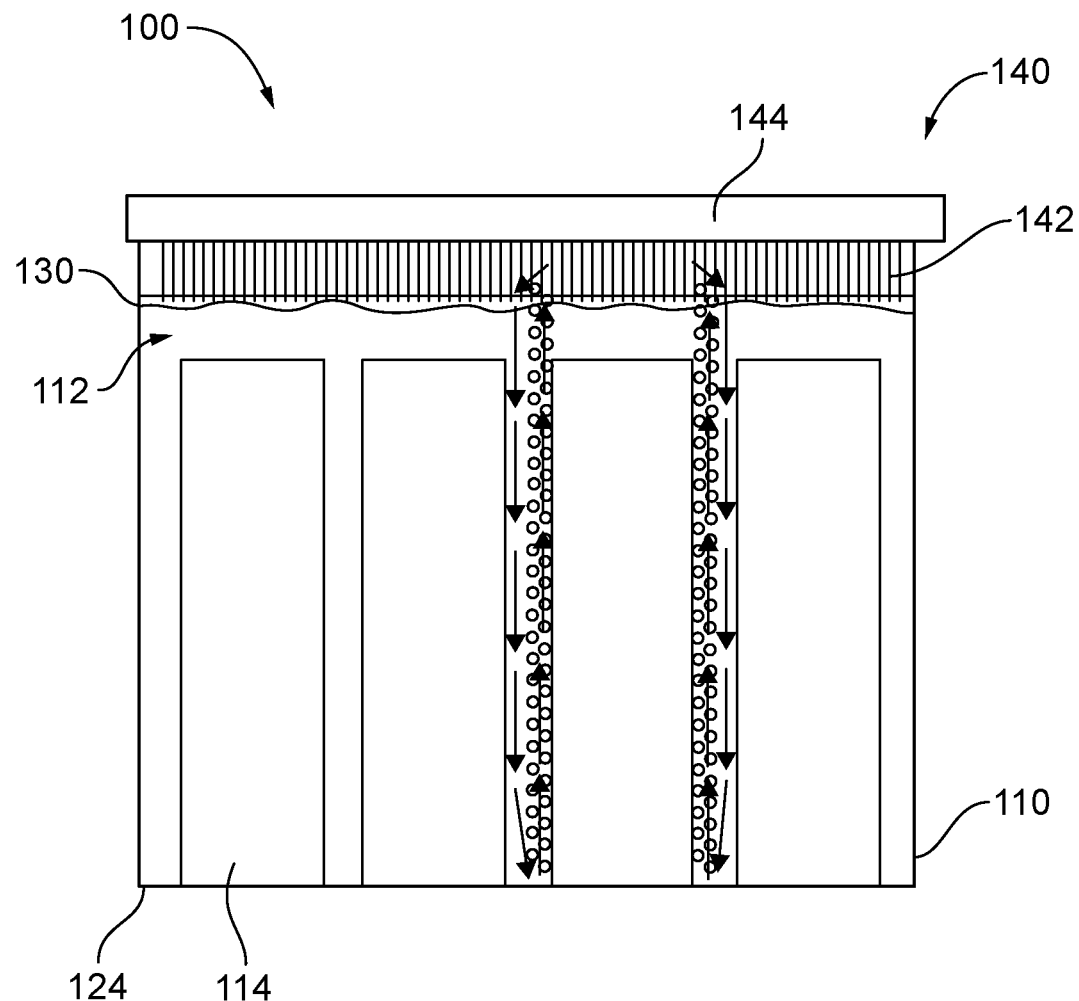
FIG. 1 is a cross-sectional schematic view of an exemplary embodiment of a thermal management system for electrical storage devices constructed in accordance with the present disclosure, showing a housing with a plurality of energy storage cells within the housing.

Reference will now be made to the drawings wherein like reference numerals identify similar structural features or aspects of the subject disclosure. For purposes of explanation and illustration, and not limitation, a partial view of an exemplary embodiment of a thermal management system for electrical storage devices in accordance with the disclosure is shown in FIG. 1 and is designated generally by reference character 100. Other embodiments of the system in accordance with the disclosure, or aspects thereof, are provided in FIGS. 2-4, as will be described. The systems described herein can be used for maintaining a relatively low component temperature within harsh environments such as power system of surface vehicles and aircrafts. The systems described herein can also be used to prevent thermal runaway of the entire system.

FIG. 1 illustrates a cross-sectional view of a thermal management system for electrical devices 100 in accordance with the present disclosure. The system 100 is shown and described relating to a battery, but other electrical storage devices, e.g., capacitors, inductors, or the like, may benefit from the system 100 as described. The energy storage system 100, as shown in FIG. 1, includes a sealed housing 110 defining an interior space 112. A plurality of cells 114 are arranged within the interior space 112 of the housing 110. As shown in FIG. 1, each of the cells 114 is positioned vertically within the housing 110 such that one side of the cells adjacent a bottom surface 124 of the housing. The remaining sides of the cells 114 are spaced apart within the housing 110. The interior space 112 of the housing 110 is filed with a cooling liquid 130 that submerges each of the cells 114. The cooling fluid 130 may be chemically stable and inert, an electrical insulator (i.e., dielectric), a thermal conductor, non-toxic, and nonflammable. The specific characteristics of the material used as the cooling fluid may be matched for the specific cells. For example, the boiling temperature and pressure curve of the material may be matched with the allowable operating temperature of the cells. The housing 110 is sealed to prevent leakage of the cooling fluid 130 or its vapor from the housing 110 and to prevent air from entering the housing 110. A cooling system 140 is positioned within the sealed housing configured to actively and passively cool each of the cells.

Referring to FIGS. 1-4, various embodiments of a thermal management system are shown. All the embodiments shown relate to immersion cooling of the cells. It will be understood that similar reference numbers will be used for each embodiment to represent similar features without the need for additional disclosure.

FIG. 1 illustrates a first embodiment of the cooling system 140 including a passive condenser 142 and a heat exchanger 144. The housing 110 is a liquid tight pressure vessel such that the heat from vapor is removed by the condenser 142 and dissipated by the heat exchanger 144. More specifically, as the cells 114 begin to heat, the cooling fluid 130 surrounding a respective cell 114 begins to boil. The density difference between the vapor and liquid allows for rapidly carrying the vapor towards the condenser 142. The heat from the vapor is dissipated by the heat exchanger 144 and is transformed back to a liquid state.

Figure 2:
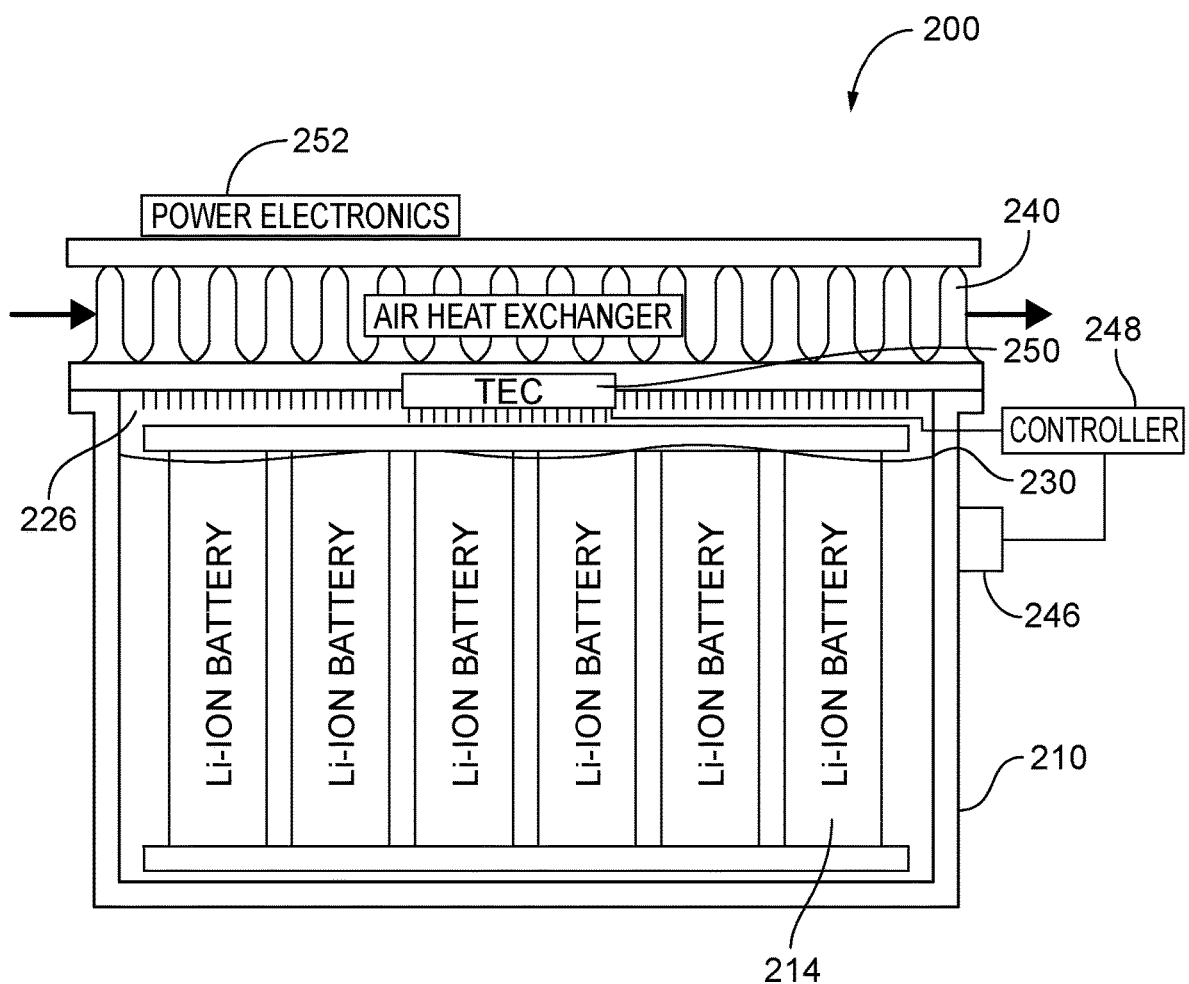
FIG. 2 is a cross-sectional schematic view of another embodiment of a thermal management system for electrical storage devices, showing a thermal electric cooler.

With reference to FIG. 2, the cooling system 240 includes a thermal electric cooler (TEC) 250 positioned defining a top surface of the interior space 212 of the housing 210. This embodiment further includes power electronics 252 spaced apart from the cells 214 outside the housing 210. The TEC 250 is configured to actively cool each of the cells 214 based on a cooling supply temperature. The active versus passive ability of the system 200 increases the efficiency of the system 200 by limiting the use of the TEC 250 while cooling conditions are adequate and reduces thermal interfaces when the TEC 250 is not required. A sensor 246 is coupled to a controller 248 configured to sense the cooling supply temperature of the system 200. In response to the cooling temperature exceeding a predetermined limit (i.e. exceeding an operating temperature of the cells 214), the controller 248 activates the TEC 250. In response to the cooling temperature falling below the predetermined limit, the controller deactivates the TEC 250.

During normal operation battery charging and discharging events will conduct heat from the battery cells 214 in a passive mode, as shown in FIG. 2. When the TEC 250 is deactivated, heat will be transferred to the cooling liquid 230 by buoyancy-driven natural convection from the exposed cell walls. The cooling liquid 230 using thermosyphon, will circulate naturally pulling the warm liquid and vapor away from the cells 214 allowing cooler liquid to cool the cells 214. In this mode, the passive condenser 254 converts the vapor back to liquid. If the cooling supply temperature exceeds the predetermined limit, the TEC 250 is activated and provides active cooling by converting the vapor back into a liquid which falls back into the liquid pool. The TEC 250 acts as a vapor cycle system cooling the liquid back down to an operating temperature for the cells 214. The heat exchanger 244 will further act to dissipate vapor when the TEC is activated.

In this embodiment, the cells 214 are submerged in the cooling liquid 230 but the entire interior space 212 of the housing is not completely filled. A gap 226 between the liquid 230 and the condenser 254 acts as a vapor space. The vapor space acts as a thermal "diode" between the cells 214 and the cooling system 240. While the focus of the TEC 250 is to provide cooling to the cells 214, in some conditions the TEC 250 may reverse its heat flow to heat the fluid 230 with condenser fins designed to extend beyond the vapor space 226 into the fluid 230.

Figure 3:
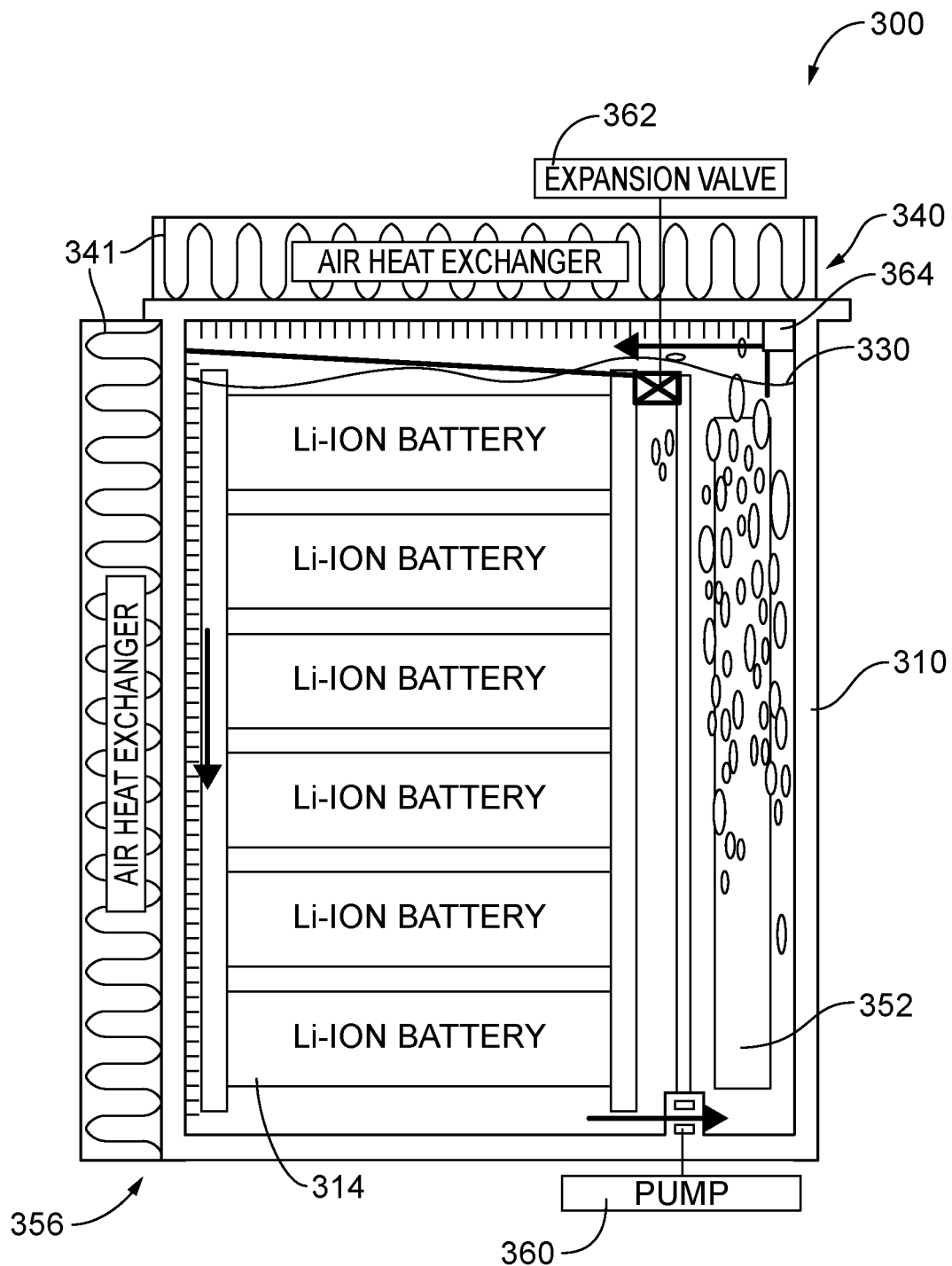
FIG. 3 is a cross-sectional schematic view of another embodiment of a thermal management system for electrical storage devices, showing a pump and an expansion valve.

With reference to FIG. 3, the cooling system 340 includes heat exchangers 341, 350 positioned defining a top surface and a side surface. In this embodiment power electronics 352 are included within the housing 310. The power electronics 352 typically operate at a higher temperature than the cells 314. The cells 314 are stored in a 'cold side' 356 of the housing (i.e., separated from the power electronics 352). In a passive mode, the vapor from the liquid 330 surrounding the power electronics 352 can be cooled through the heat exchanger 341, 350 with cooled liquid dropping down (i.e. through the force of gravity) around the cells 314. In an active mode, a pump 360 is activated based on the cooling supply temperature to circulate the cooling liquid 330 through the system. The vapor flows to the heat exchangers 350 and cooled liquid is subsequently expanded to a lower pressure through expansion valve 362 and then circulated around the cells 314.

Figure 4:
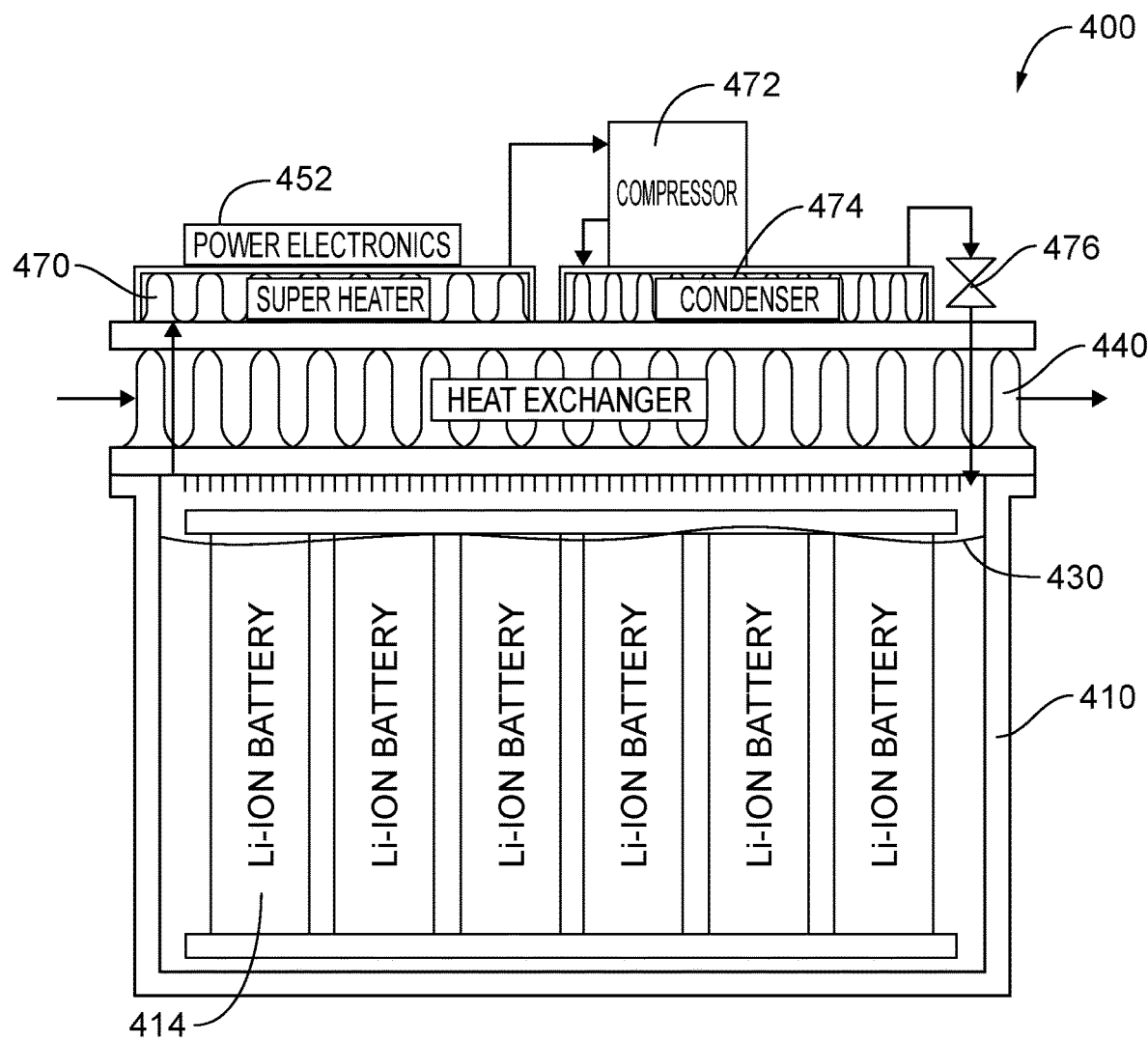
FIG. 4 is a cross-sectional schematic view of another embodiment of a thermal management system for electrical storage devices, showing a super heater, compressor and expansion valve.

With reference to FIG. 4, another embodiment is shown where the system 100 can function as a passive system until the cooling supply exceeds the maximum allowable temperature of the cells 414. Once that temperature is reached, a compressor 472 is activated and vapor is drawn into a super heater 470 to cool power electronics 452. Coolant 430 flows to the compressor 472 and into a second condenser 474 and expansion valve 476. The cooled liquid is supplied to the liquid pool 430 surrounding the cells 414. While the focus of the active system is to provide cooling the cells 414, in some conditions the compressor 472, the expansion valve 476, and the power electronics 452 may be used to heat the fluid 430 and raise the temperature of the cells 414 to a desired temperature.

The methods and systems of the present disclosure, as described above and shown in the drawings provide for a thermal management system for electrical devices with superior properties including active and passive modes. While the apparatus and methods of the subject disclosure have been shown and described with reference to preferred embodiments, those skilled in the art will readily appreciate changes and/or modifications may be made thereto without departing from the scope of the subject disclosure.

What is claimed is:

1. An energy storage system, comprising:
a sealed housing defining an interior space;
a plurality of cells arranged within the interior space of the housing;
a cooling liquid submerging each of the cells;
a cooling system within the sealed housing configured to actively and passively cool and heat each of the cells;
wherein the cooling system includes an active condenser, a passive condenser, and a cold plate, wherein the passive condenser is configured to cool the cells while a cooling supply temperature is below a predetermined temperature, wherein the active condenser is configured to cool the cells above the predetermined temperature, and wherein the cold plate is configured to dissipate heat from the cooling liquid in the active and passive condensers; and
power electronics positioned within the interior space of the housing, wherein the power electronics are separated from the plurality of cells, wherein the plurality of cells are on a cool side of the housing, wherein the active condenser includes a pump and an expansion valve, wherein in an active mode the pump is activated to drive the cooling liquid in a circuit, wherein the circuit includes coolant vapor flowing through one or more heat exchangers, coolant vapor being cooled in the one or more heat exchangers to liquid coolant, which is subsequently expanded through the expansion valve and then circulated around the cells.

2. The energy storage system of claim 1, wherein the cooling system defines a top surface of the interior space of the housing.

3. The energy storage system of claim 1, wherein the cold plate is configured to cool the cells with the active and passive condensers by converting vapor to liquid such that the liquid falls towards the cells through the use of gravity.

4. The energy storage system of claim 1, wherein the passive condenser is configured to act passively through the use of thermosyphon while the cooling supply temperature remains below a cell limit.

5. The energy storage system of claim 1, wherein the cooling liquid is a two-phase fluid in the operating temperature range of the cells.

6. The energy storage system of claim 1, wherein the cells include battery, capacitor, or other energy storage cells.

7. The energy storage system of claim 1, wherein the cooling system includes a heat exchanger configured to remove the heat from the cooling system.

8. The energy storage system of claim 1, wherein the pump and the expansion valve are configured to activate based on cooling supply and component temperature.

* * * * *